S. H. ANDERSON.
Whiffletree.
No. 85,631.
Patented Jan. 5, 1869.
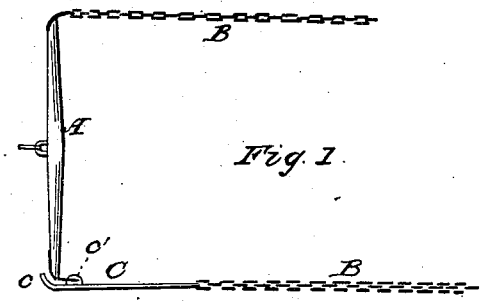
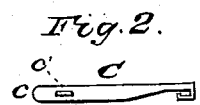
Witnesses
Robert Burns,
George W. Herbert
Inventor
S. H. Anderson

SPENCER H. ANDERSON, OF HANNIBAL, MISSOURI.

Letters Patent No. 85,631, dated January 5, 1869.

IMPROVEMENT IN WHIFFLE-TREES.

The Schedule referred to in these Letters Patent and making part of the same.

*To all whom it may concern:*

Be it known that I, SPENCER H. ANDERSON, of Hannibal, in the county of Marion, and State of Missouri, have made certain new and useful Improvements in Tree and Corn-Protector Attachment for Whiffle-Trees; and I do hereby declare that the following is a full and clear description thereof, reference being had to the accompanying drawings, and to the letters of reference marked thereon.

The object of this invention is to construct a coupling-attachment for the ends of whiffle-trees, by means of which the traces of the animals drawing the same shall be coupled thereto in such a manner as to avoid injury to trees or plants, such as corn, &c., while the ground contiguous to the said trees or plants is being cultivated by plowing or otherwise.

The said coupling-attachment is also equally well adapted to any other kind of farm-work, and may also be readily applied to any whiffle-tree.

To enable those skilled in the art to make and use my improved whiffle-tree-attachment, I will proceed to describe its construction and operation.

Figure 1 of the drawings is a plan of a whiffle-tree fitted with one of the protector-attachments.

Figure 2 is a side elevation of the same.

The whiffle-tree A may be of any approved form of construction, and the trace-chains B will be attached to the ends of the said whiffle-tree by means of link-protectors C.

These protectors should be from twelve to fourteen inches long, (more or less,) and may be made wholly of metal, or partly of metal and partly of wood.

The back end of the trace or chain B will be attached to the forward end of the protector-piece C, by means of a suitable hook, and the back end of the said piece C will be secured to the whiffle-tree, so as to overlap the end thereof, and prevent it from catching against any tree or corn-stalk, should the whiffle-tree be drawn near the said tree or stalk.

The back end of the piece C should be curved inward at $c$, so as to enable it to slide smoothly off of a tree, after having been in contact with the same, without barking it.

The back end of the said piece C should be wide enough to completely cover the end of the whiffle-tree, so as to prevent its catching on anything, either above or below the protector-piece.

Between the curved end $c$ and the forward end which is hooked to the trace, the piece C may be formed of one solid piece of wood or metal, smoothly rounded on the outside, or it might be constructed in the form of a link having two side rails connected at the ends.

The hook $c'$, by means of which the piece C is secured to the end of the whiffle-tree, may be constructed in any suitable manner, which will allow the piece to turn laterally and vertically at the point of coupling.

Having described my invention,

What I claim, is—

The coupling-protector piece C, when applied to the end of the whiffle-tree A, and coupled to the trace B, in the manner and for the purpose herein set forth and described.

S. H. ANDERSON.

Witnesses:
M. RANDOLPH,
ROBERT BURNS.